(No Model.)
H. L. BEACH.
CIRCULAR SAWING MACHINE.
No. 537,521. Patented Apr. 16, 1895.
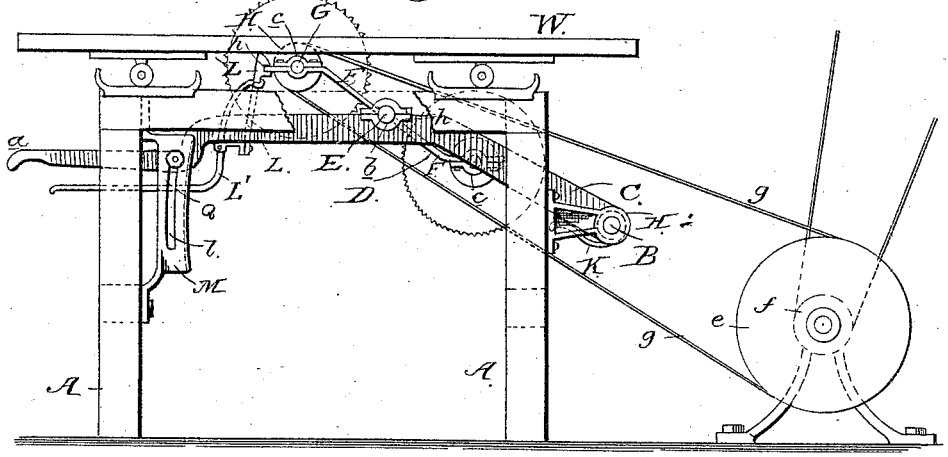
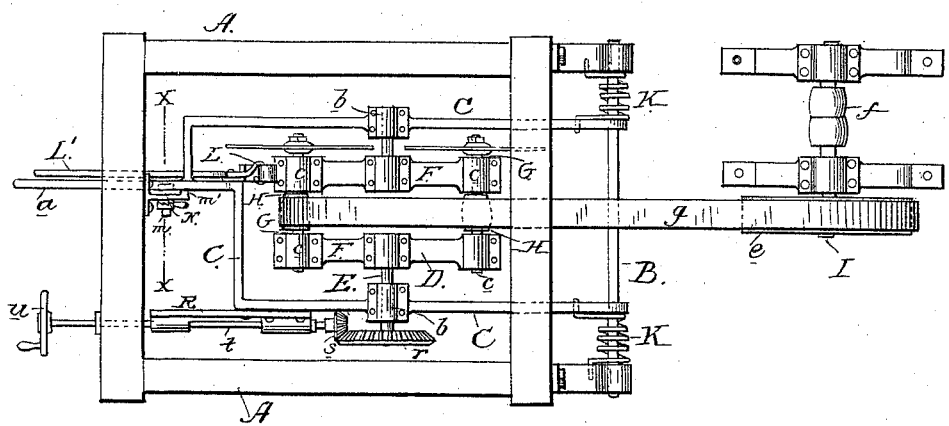
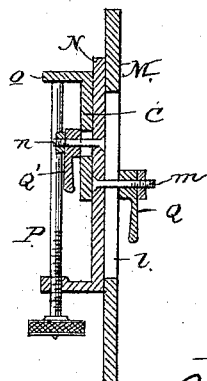
WITNESSES
Chapman Fowler
M. A. Smith
INVENTOR
Henry L. Beach,
By T. Walter Fowler
Attorney.

UNITED STATES PATENT OFFICE.

HENRY L. BEACH, OF MONTROSE, PENNSYLVANIA.

CIRCULAR SAWING MACHINE.

SPECIFICATION forming part of Letters Patent No. 537,521, dated April 16, 1895.

Application filed January 30, 1895. Serial No. 536,687. (No model.)

*To all whom it may concern:*

Be it known that I, HENRY L. BEACH, a citizen of the United States, residing at Montrose, State of Pennsylvania, have invented certain new and useful Improvements in Circular Sawing Machines; and I do hereby declare the following to be a full, clear, and exact description of the invention, such as will enable others skilled in the art to which it appertains to make and use the same.

My invention relates to certain new and useful improvements in circular sawing machines, and it consists of the constructions, arrangements and combinations of parts which I shall hereinafter fully describe and claim.

In the accompanying drawings forming part of this specification, Figure 1 represents a plan view of a circular sawing machine embodying my invention and showing the table removed. Fig. 2 is a side elevation of the same. Fig. 3 is a cross sectional view on the line $x$—$x$ of Fig. 1.

The main frame A of the machine may be of any desired construction, possessing sufficient strength to support the various parts of the machine, and make a strong rigid frame. Extending transversely across this frame and supported in suitable bearings is a shaft B, which furnishes a support for a second frame C, which is contained within the main frame, and whose side bars or arms are pivotally mounted upon said shaft, and thence extend forwardly for a considerable distance and then unite in a single arm which projects beyond the front end of the machine, and is provided with a handle portion $a$ by means of which this pivotally mounted frame C may be swung in vertical or approximately vertical planes.

While the foregoing is descriptive of a frame especially adapted for my purposes because of its simplicity and the fact that it may be cast or otherwise made of one piece, I do not wish to be understood as limiting myself to this specific form of frame, as other forms may be used without departing from the nature of my invention; it being only important that said frame shall be contained within the main frame, and shall possess the movements in vertical or approximately vertical planes as before mentioned.

The swinging or pivoted frame C furnishes a support for a double saw arbor carrying frame D, which is mounted at its center upon studs or trunnions E mounted in bearings $b$ on the frame C; or an equivalent shaft formed by extending the studs or trunnions across the frame D may be substituted for the independent studs or trunnions if desired.

The saw carrying frame has two arms F radially disposed and at the ends these arms are formed or provided with boxes or bearings $c$ in which the saw arbors G are mounted, said arbors carrying at one end any desired or well known form of saw, for instance a rip saw on one arbor and a cross cut saw on the other, while on the arbors are mounted band pulleys H, as shown.

Exterior of the machine, is suitably mounted a counter-shaft I having a band wheel $e$ and band pulley $f$, and from the band wheel $e$ a belt $g$ extends to and around one of the pulleys of the centrally mounted saw arbor carrying frame; while a second belt from a suitable source of power passes around the band pulley $f$ and furnishes the means for driving the counter-shaft.

The saw arbor frame is centrally suspended upon its shaft, and is revoluble about said shaft so that either of the saws may be brought into operative position; and the saw arbors being equi-distant from the center of movement of the frame, the latter may be revolved to quickly change the saws and enable the belt to engage and drive the pulley on either arbor.

The relative positions of the shaft upon which the pivoted frame C is hung, and counter-shaft I are such that the center of one is slightly out of line with the other, whereby when the forward end of the frame C is lowered to vertically lower the cutting plane of the upper saw, the revoluble saw arbor frame will describe an arc which if continued downward would diverge from the point where the two arcs meet. The purpose of this is, that when the operating saw is at its highest cutting point and cutting heavy timber the greatest power is required to cause it to perform its work; but as the cutting plane of the saw is lowered as when cutting thin stuff, less power is required. In the greatest elevation of the saw the belt is tight and approximately the full power of the same is communicated to the saw, but when it is desired to lower the cutting plane, for any purpose, the belt becomes less tight as not so much power is required. The revoluble saw arbor frame being carried by the pivoted frame C is raised and lowered with this latter frame and is held in a locked position against rotation; and in whatever position the parts are adjusted the relative position of the revoluble frame and belt is always maintained. In other words the revoluble frame D is straddled by the belt, and its pulleys occupy a plane that is approximately a central line between the upper and lower folds of the belt, and this position is approximately retained whatever be the adjustment of the saw and its adjuncts. There is, therefore, no danger of the belt interfering with the pulley of the idle arbor, and no necessity for belt tighteners; and I am permitted to belt directly to the pulley of the saw in use, and require no guide or direction pulleys for keeping the folds of the belt out of contact with the pulley on the idle saw arbor.

The frame C being pivotally hung it is desirable to employ some means for nearly balancing or equalizing its weight so as to assist the operator in raising the same after it has been lowered. A simple and effective way of accomplishing this result is to employ strong springs K which are coiled upon the shaft B as shown in Fig. 1. These springs have one end or member fixed to some portion, say to a journal box or other convenient part of the main frame A, while their opposite ends are carried forward and are adapted to bear under the side arms or other part of the frame C to balance the weight of the frame and assist the operator in raising the same from its lowered position.

Each end of the revoluble frame D has a lug $h$ or other form of catch which is designed to be engaged by a notch or other form of latch formed on or attached to a spring arm L secured to the frame C and operated by a pivoted lever L' which is extended forwardly to form a handle portion by which the spring arm is forced out of its engagement with the frame. By this means the frame D is normally locked against revolution about its axis while the saw is in operation; and the connection of the spring arm L with the revoluble frame may be readily broken by a movement of the free end or handle portion of the lever L', and the frame D revolved about its center of movement to bring the other saw into operative position, after which the frame is again locked to the spring arm by the latter snapping into engagement with it.

In revolving the frame D so as to bring into use the heretofore idle saw, the band pulleys on the saw arbor engage the inner surfaces of the folds of the belt and spread the belt so that said frame may be revoluted about its axis; and without any danger of the belt slipping off said pulleys.

The means for securing the free end of the pivoted frame and locking the parts in a secure manner are substantially as follows: A guide, plate or casting M bolted to the main frame, is formed with a slot $l$; and a sliding plate N fitted against the casting M has a stud $m$ fixed to it and projecting through said slot;
said sliding plate being confined in place by means of a lug $m'$ on the casting M. The sliding plate N also carries a second stud or pin $n$ which projects in an opposite direction to the other stud $m$, and through a slot in the frame C. The frame C is provided with a flange or bearing $o$, against which the end of a hand screw P engages, said screw passing through a threaded bearing in an inwardly turned flange on the slidable plate N as shown in Fig. 3. The outer ends of the studs or pins $m$ and $n$ are threaded to receive the well known form of locking eccentrics or levers Q Q' which are designed to lock the parts securely after the desired adjustments have been obtained.
The purpose of this locking means may be briefly stated as follows: The operator wishing to lower the cutting planes of his saw, say from ordinary sawing to a fine adjustment for grooving, is permitted to do the same by loosening his eccentric lever Q and pressing down the free end of the frame to a point about what is required for the saw in its new work and securely locking it. This downward movement of the frame carries all of the parts connected with the free end of the frame down with it. Then the eccentric lever Q' is loosened and the hand screw P turned to cause the frame C to be adjusted very accurately on the slidable plane N, which adjustment is communicated to the saw by reason of the connection of the parts shown in Fig. 3, and the cutting plane of the saw is adjusted with great nicety and precision. After the adjustment has been secured the lever or eccentric Q' is again locked and the parts held in their adjusted positions.

This invention may be used in connection with any well known form of table W; and one that is especially useful in machines of this class is described and claimed in my former patents, Nos. 429,836 and 429,837, dated June 10, 1890.

The frame D which carries the double saw arbors may be revolved by any suitable means, one form of which is shown in the drawings as consisting of a bevel gear $r$ on the axis of the revoluble frame, adapted to mesh with a bevel pinion $s$ on a longitudinal shaft $t$ which is mounted in bearings on a casting R bolted to the pivoted frame C. This shaft extends to the outside of the machine and is provided with a hand wheel $u$, or a crank or lever if preferred, whereby when the frame C is dropped into its lowered position so that the upper saw may clear the table, and the hand wheel turned, after unlocking the revoluble frame, the motion of the wheel is communicated to the bevel gearing and the frame D is revolved about its axis to bring the other saw into operative condition, the said frame D snapping into engagement with the spring arm L to lock the frame as before described.

Having thus described my invention, what I claim as new, and desire to secure by Letters Patent, is—

1. In circular sawing machines, the combination, with a revoluble frame having arbors adapted to receive saws, of a support for said revoluble frame, adjustable in vertical planes, and a driving belt passing over said revoluble frame to a pulley on one of the arbors, and receiving the revoluble frame centrally between its folds, said belt having its tension automatically adjusted with relation to the kind of work to be performed, by the adjustment in vertical planes of the support for the revoluble frame.

2. In circular sawing machines, the combination, with a frame revoluble about a central axis, and carrying at each end an arbor adapted to receive a saw, of a frame pivotally secured and having the revoluble frame mounted within it whereby the cutting plane of the saws carried by the revoluble frame is adjustable in vertical planes by the movement of the supporting frame, a driving belt receiving the revoluble frame between its folds, and adapted to drive a pulley on one of the arbors of said frame, and means for locking the revoluble frame and pivoted frame in their adjusted positions.

3. In circular sawing machines, the combination, with a revoluble frame having independent arbors adapted to receive saws, of a driving belt receiving the revoluble frame between its folds, a support for the revoluble frame adjustable in vertical planes and carrying the frame and its adjuncts with it in its adjustments whereby the belt is kept out of contact with the idle arbor of said revoluble frame and means for locking the revoluble frame and support in position.

4. In circular sawing machines, the combination, with a revoluble frame carrying arbors adapted to receive saws, of a frame pivoted at one end and having its opposite end free, said frame supporting the revoluble frame and its adjuncts; a spring arm carried by the pivoted frame, having a means for engaging and locking the revoluble frame in position, means for locking the pivoted frame and means for operating the saws.

5. In circular sawing machines, a revoluble frame having a plurality of arbors adapted to receive saws, a frame adapted to support and carry the revoluble frame, having one end pivotally mounted and the opposite end free, means for locking said free end, and means for balancing the weight of the pivoted frame and assisting the raising of the frame when once depressed.

6. In circular sawing machines, the combination, with a revoluble frame adapted to support a plurality of saws, a frame for supporting said revoluble frame having one end pivotally mounted and its opposite end free, means for locking said free end and a spring bearing under the frame and balancing its weight so as to assist its free end being raised from a lowered to an elevated position.

7. In circular sawing machines, the combination of a frame hinged or pivoted at one end and having its opposite end movable in vertical planes, a guide for said free end in its movements, a saw carrying frame pivotally mounted at its center on the vertically adjustable frame, an independent piece slidable on the guide and means for locking it in place, a screw carried by the movable plate and engaging said pivoted frame and adjusting it whereby after the saw has been adjusted by the movement of the pivoted frame it is further adjusted by the turning of the screw, and a delicate adjustment secured, and means for locking the pivoted frame in position.

8. In circular sawing machines, the combination, of a frame hinged or pivoted at one end and having its opposite end movable in vertical planes, a revoluble frame mounted on said pivoted frame and provided with saws, a slotted plate or casting forming a guide for said free end, a slide interposed between the free end of the hinged frame and the slotted casting or guide, having studs or pins projecting from opposite sides, one through the slot of the casting and the other through a slot in the frame, clamping levers or eccentrics engaging said stud or pins for locking the parts together, and a screw threaded in a flange or lug on the slide and engaging a flange on the pivoted frame to adjust the saw with precision after the preliminary adjustment of the same has been approximately obtained by the adjustment of the hinged frame.

In testimony whereof I affix my signature in presence of two witnesses.

HENRY L. BEACH.

Witnesses:
T. WALTER FOWLER,
CHAPMAN FOWLER.